Dec. 13, 1955     T. W. LEPKOWSKI     2,726,416

LIQUID APPLICATOR

Filed Dec. 29, 1950

INVENTOR.
THOMAS W. LEPKOWSKI
BY
ATTORNEY.

United States Patent Office 2,726,416
Patented Dec. 13, 1955

2,726,416

LIQUID APPLICATOR

Thomas W. Lepkowski, New York, N. Y.

Application December 29, 1950, Serial No. 203,456

1 Claim. (Cl. 15—134)

The invention relates to an implement for applying a liquid coating to a surface, and more especially to a novel applicator assembly whereby a volume of the liquid may be stored in the applicator without leakage or spillage thereof. I am aware that various expedients have been proposed to attain this end, but all have been found unsatisfactory in some respect.

The present invention has for an object to provide an applicator for use particularly in connection with the application uniformly of a cleaning and fogging-prevention liquid or solvent to a glass surface, although I do not wish to be understood as restricting the use of the novel applicator to such purpose.

A further object of the invention is to provide a device of this character which may be constructed compactly as in case of its use for the cleaning of the lenses of eyeglasses, and in substantial proportions for use in the cleaning, for example, of the windshield and windows of an automobile as well as to insure of their not becoming fogged for an appreciable length of time thereafter.

A still further object of the invention is to provide a novel means for retaining a substantial volume of liquid in the applicator which is so constructed that neither spillage nor leakage of the same occurs, but discharge is effected only when pressure is exerted upon a movable and more or less rigid swab or wiper element thereof, as in applying it over the surface to be treated with the liquid.

Another object of the invention is to provide a compact and readily transportable applicator device which is economical to manufacture, and a device which is simple to use, it being necessary merely to remove a cap to expose a suitable swab or wiper element saturated with the liquid.

In carrying out the invention, a more or less elongated wiper element of suitable rigid or semi-rigid material of a capillary nature is frictionally retained for axial displacement in the outer portion of a, generally, cylindrical container adapted to be normally closed by a screw cap or like element which also serves to force the wiper element inwardly. The inner end of this wiper element is designed to contact a compressible and resilient liquid-storage element located in the bottom of the container, which compressible element is also of a porous nature to be highly absorbent to retain a substantial volume of the liquid which is to be applied by the wiper element, protruding beyond the retainer mouth when the cap is removed therefrom. In screwing on the said cap, it will be understood that the inner contacting end of the wiper element will compress the compressible liquid-storage element to cause it to force liquid into the abutting end of the capillary wiper element material which becomes saturated therewith—the liquid being conveyed by the capillary action of the material to the outer end of said wiper element for application thereby over a surface and under the pressure afforded by the compressible element.

The nature of the invention, however, will best be understood when described in connection with the accompanying drawings, in which.

Figure 1:
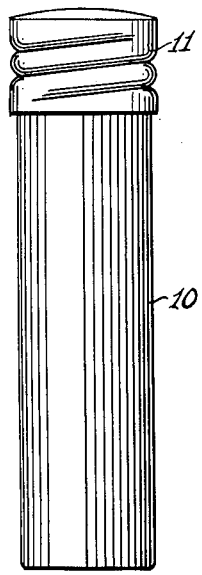
Fig. 1 is a front elevation of the applicator shown on an enlarged scale.
Figure 2:
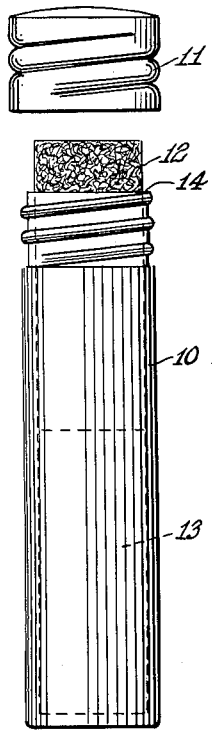
Fig. 2 is a similar view of the applicator with the closing cap separated from the container portion thereof.
Figure 3:
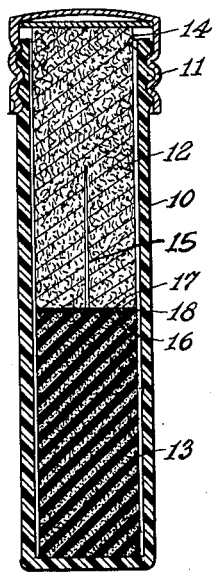
Fig. 3 is a vertical section through the applicator as shown in Fig. 1.

Referring to the drawings, Figs. 1–3, inclusive, the novel applicator is set forth as of the pocket type such as to be suitable particularly for use in the cleaning of eyeglasses, which frequently become spotted with foreign matter or fogged. As shown, the applicator comprises a more or less elongated cylindrical container 10 which may be of metal, plastic or the like and is provided with a gasket-fitting screw cap 11 for sealing the same when the applicator is not in use. Within the container 10 are mounted two elements—an outer, more or less rigid, pad element or wiper element 12, and an inner compressible and resilient liquid-storage element 13 which is porous to be highly liquid-absorbent. The former element 12 is of a capillary material, such as felt of the variety known in the trade as "firm" or "rock hard" felt, and it is designed to convey liquid from its inner end to the outer end for surface moistening purposes. It is caused, as will hereinafter be set forth, to protrude beyond the mouth 14 of the container 10, when the cap 11 has been removed, for manipulation of the wiper element over a surface in the application of the liquid thereto. The said element 12 is to be frictionally retained within the outer end of said container, having a more or less snug fit therein but readily displaceable axially of the container. To this end it is desirable to split the element at its inner end longitudinally inwardly a short distance, as is indicated at 15. This, furthermore, not only affords a suction effect but increases the absorptive surface of the wiper element. After applying with the protruding end of the wiper element a liquid to a surface, the latter is to be wiped by a suitable cloth material or the like, as is well understood.

The latter element 13 fits loosely within the container at the bottom thereof and presents a surface 16 contacting the inner end surface 17 of the wiper element 12, the combined lengths of the two elements being greater than the length of the container 10. Element 13 is of a material of far greater resiliency than that of the element 12 and performs the duty of a follower; also, it is of a highly moisture-absorbent nature. The well-known sponge or foam rubber, either natural or synthetic, has been found particularly suitable in this respect; and is to be saturated in the container with the selected liquid, whereupon the wiper element 12 is fitted into the container until its inner end contacts the juxtaposed end of the said liquid-storage element 13. The contact may be made permanent, if desired, by cementing the two surfaces together as is indicated at 18, or in any other suitable manner to allow transfer of liquid from one to the other.

Upon screwing on the cap 11, the element 12 is forced inwardly to exert pressure upon the element 13 which is compressed thereby to force liquid into the inner contacting end of the element 12. The said liquid will then be conveyed by capillary action through the latter element so that when the cap is removed liquid is available for moistening a surface in manipulating the said wiper element 12 thereover. Liquid will be continued to be applied since more or less pressure is exerted in operating the protruding portion of the wiper element over a surface, thereby to compress the liquid-storage element 13 which acts as a follower member.

Figure 4:
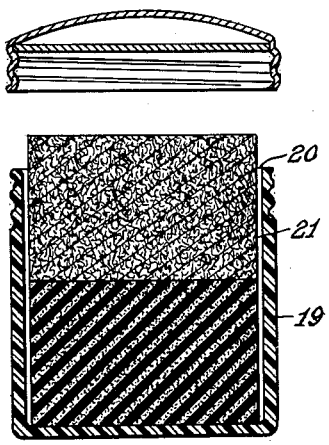
Fig. 4 is a vertical sectional view illustrating a modification, with cap separated from the container.

The container may be constructed of a shape best suited to the use to which the applicator is to be put; and a modified form of such container is shown in Fig. 4 of the drawings, this particular embodiment being intended for the application of liquid over extended surfaces such as windshields and windows of an automobile. The container 19 will then be substantially larger to accommodate a greater volume of liquid and its mouth 20 also is made relatively large to afford a substantial rubbing surface of the wiper element 21.

I claim:

A liquid applicator comprising an elongated container having an opening at one end; a manually removable cap member screwable over the open end of the container; a porous, highly resilient, semi-rigid, self-sustaining and appreciably compressible liquid-storage element maintained within and freely extensible in the innermost portion of the container, with one face contacting the bottom thereof; and an axially displaceable applicator, self-sustaining and liquid-transmitting pad element of material more rigid than the liquid-storage element, superimposed thereover to contact its outer face and of a length combined with the liquid-storage element length to cause said applicator pad element to project, only when the cap is not applied, substantially beyond the mouth of the container, the depth of the cap member being such that when said cap member is applied to the mouth of the container its inner face will serve as a means to contact the projecting end of the applicator pad element and force the latter appreciably into the container to compress thereby the liquid-storage element and cause it to discharge liquid to the applicator pad element.

References Cited in the file of this patent

UNITED STATES PATENTS

| | | |
|---|---|---|
| 1,015,539 | Breider | Jan. 23, 1912 |
| 1,356,910 | Delbare | Oct. 26, 1920 |
| 1,811,493 | Cochran | June 23, 1931 |
| 2,258,030 | Oxley | Oct. 7, 1941 |
| 2,347,355 | Lindblad | Apr. 25, 1944 |

FOREIGN PATENTS

| | | |
|---|---|---|
| 596,990 | France | Nov. 5, 1925 |